C. B. JOHNSON.
CONNECTOR FOR BATTERIES.
APPLICATION FILED OCT. 7, 1914.

1,241,737.

Patented Oct. 2, 1917.

Witnesses

Inventor
Clarence B. Johnson
By John A. Saul
Attorney

UNITED STATES PATENT OFFICE.

CLARENCE B. JOHNSON, OF NORFOLK, VIRGINIA, ASSIGNOR OF ONE-THIRD TO PALMER R. INGRAM AND ONE-THIRD TO J. EDWARD COLE, BOTH OF NORFOLK, VIRGINIA.

CONNECTOR FOR BATTERIES.

1,241,737.  Specification of Letters Patent.  Patented Oct. 2, 1917.

Application filed October 7, 1914. Serial No. 865,515.

*To all whom it may concern:*

Be it known that I, CLARENCE B. JOHNSON, a citizen of the United States, residing at Norfolk, in the county of Norfolk and State of Virginia, have invented certain new and useful Improvements in Connectors for Batteries, of which the following is a specification.

My invention relates to connectors for batteries, and the like, by means of which the wires may be connected to the battery or electrode with ease and facility and safely secured thereto.

My object is to construct a device of wire or the like material, so that it may be manufactured separately, and connected to the battery by means of screws, solder, or otherwise as desired, and be detached therefrom, when necessary.

In the drawings forming a part of this specification, and in which like symbols of reference represent corresponding parts in the several views:—

Figure 3:
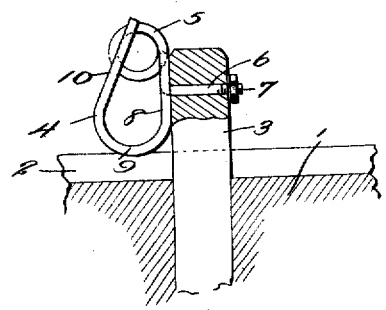
Fig. 3 is a modification of the same in elevation, showing it connected with a screw.

In the drawings, 1 indicates the battery to which the device is connected; 2 is the rim of the battery; and 3 is the electrode of the same. 4 represents the connector formed of a single piece of wire, having an upwardly extending portion 8, twisted to form a loop 5, which terminates in an end fastening prong 6, which may be a screw or the like, as shown in Fig. 3, and having a nut 7 to secure it to an electrode or other support. The connector bends at 9 to form a spring portion 10, which forms the clip for holding the wire.

Figure 1:
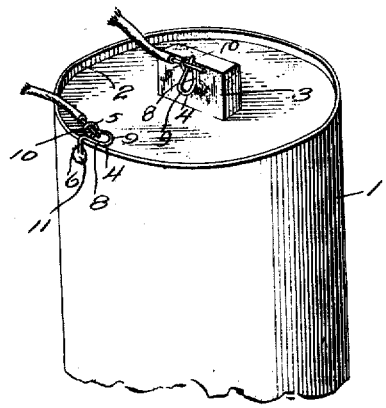
Figure 1 is a sectional view of a battery with my invention in position thereon.
Figure 2:
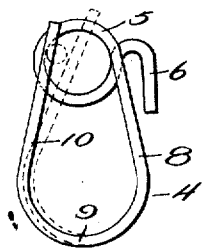
Fig. 2 is a view in elevation of the device.

In Fig. 1 I have shown the wires connected to the battery, the same being run through the loop, and the spring 10 normally clamping the same. 11 is the solder fastening the clip to the battery.

Having now fully described my invention, what I claim as new, and desire to secure by Letters-Patent, is:—

1. A connector for batteries, having one portion twisted to form a loop to receive a wire, said loop terminating in an end adapted to connect to a support, and having its other end turned into a second loop and adapted to traverse the first loop and lock a wire therein.

2. An article of manufacture, formed of a single wire, the same twisted into a loop and terminating in an attaching means, and the other extending some distance therefrom to form a second spring loop whose terminal returns and traverses the first-mentioned loop to clamp a wire, or the like, therein.

In testimony whereof I affix my signature, in presence of two witnesses.

CLARENCE B. JOHNSON.

Witnesses:
Mrs. S. B. WHITE,
FRED C. ABBOTT.